(12) United States Patent
Bowers

(10) Patent No.: US 6,308,285 B1
(45) Date of Patent: Oct. 23, 2001

(54) WARM PROCESSOR SWAP IN A MULTIPROCESSOR PERSONAL COMPUTER SYSTEM

(75) Inventor: Daniel R. Bowers, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/251,830

(22) Filed: Feb. 17, 1999

(51) Int. Cl.$^7$ ................................................ G06F 11/22
(52) U.S. Cl. ................................. 714/10; 713/100
(58) Field of Search ........................... 713/100, 323, 713/324; 709/220, 221; 714/3, 10, 13, 23

(56) References Cited

U.S. PATENT DOCUMENTS 5,761,518   6/1998   Boehling et al. .................. 395/821
5,978,923 * 11/1999   Kou ................................... 713/323

* cited by examiner

Primary Examiner—Thomas M. Heckler
(74) Attorney, Agent, or Firm—Akin, Gump, Strauss, Hauer & Feld, LLP

(57) ABSTRACT

A scheme may be used to replace a processor in a multi-processor computer without the need for turning the computer off to replace the processor. In this scheme, all of the processors on the bus are placed into sleep mode. Then, power is disconnected from the processor to be replaced, and the processor is removed. The replacement processor is then powered up and configured in the same manner as the processor it replaced. The replacement processor is then placed into return the computer to normal operation without the need to reboot the computer.

48 Claims, 5 Drawing Sheets

WARM PROCESSOR SWAP IN A MULTIPROCESSOR PERSONAL COMPUTER SYSTEM

BACKGROUND OF THE INVENTION

1. Field Of The Invention

The present invention relates generally to computer systems and, more particularly, to methods and apparatus for facilitating the removal or replacement of a processor.

2. Description Of The Related Art

About two decades ago, a relatively compact and basic computing device, which would come to be known as the personal computer or PC, was being developed. Like all personal computers since, these early personal computers utilized microprocessors coupled to various types of memory devices. However, due to the extremely limited computing capabilities of these early microprocessors and the limited size and costliness of high speed memory, these early personal computers truly were nothing but stand alone personal computing devices.

In the intervening years, microprocessors, memory devices, software, and many other portions of a computing system have seen rapid improvements in speed, capacity, complexity, and performance. By way of example, the latest generation microprocessors from Intel Corporation include the Pentium, Pentium Pro, and Pentium II Xeon (Slot-2) microprocessors. These processors are so powerful that they not only would have been considered an unbelievable evolution over the Z80 and 8080 microprocessors of two decades ago, but they also offer significant enhancements over the prior generation 486 processors. Even in view of this rapid and incredible improvement of microprocessors, the resource requirements of software are always increasing, as are the variety of uses for "personal" computers. These needs, in turn, drive the need for the design and development of ever more powerful and efficient computer systems.

In view of these vast technological improvements, personal computers have made great strides from their humble beginnings to provide solutions for the ever expanding needs and desires of the computing public. Over the course of the past twenty years, personal computers have become an indispensable part of everyday life. Virtually every business relies to some degree upon personal computer systems, and personal computers are now found in many homes. Indeed, personal computers control everything from stock market trading to telephone networks.

For example, two decades ago, virtually all large or complicated computing operations, from data processing to telephone networks, were handled by large mainframe computers. However, networks of microprocessor-based personal computers have made tremendous inroads into areas that were once the exclusive domain of such large mainframe computers. Such networks of personal computers provide the computing power and centralized access to data of mainframe systems, along with the distributed computing capability of stand alone personal computers. These networks typically include tens, hundreds, or even thousands of personal computers, including powerful personal computers that can act as servers. Indeed, as such networks have become larger and more complex, there has been a need for improving the computing performance of servers on the network. To address this need for more powerful servers, multiple processors are now being used in personal computers which are configured to act as servers.

The expansion of microprocessor-based personal computers into the mainframe domain, however, has not been problem free. Mainframe computers have historically been designed to be reliable and extremely fault tolerant. In other words, a failure of a portion of the mainframe computer does not typically result in lost or corrupted data or extensive down time. Moreover, mainframe computers have historically been very service friendly. In other words, mainframe computers may be upgraded or repaired, in many circumstances, without shutting down the computer. Because personal computer networks are increasingly being used instead of mainframe systems, users are demanding that such networks provide fault tolerance and serviceability similar to that found in the mainframe systems.

In view of these user demands, manufacturers need to devise various ways for improving the serviceability of the personal computers used in personal computer networks. Many of these developments should concentrate on the serviceability of the servers in a personal computer network, because servers are typically the cornerstone of most networks. In other words, because the servers typically provide applications, data, and communications among the various work stations, it would be desirable if a server could be serviced without unduly affecting the network. Thus, when a processor needs to be removed from operation, it would be desirable to replace the component with minimal disruption to the network.

To replace a processor, it currently must be taken out of service temporarily. This may cause loss of information and of configuration, and it typically requires the system to be rebooted. Depending upon the redundancy and complexity of the computer system, such a temporary removal may have wide ranging effects, from slightly degrading the overall performance of the computer system to temporarily removing the computer system from service. This problem is exacerbated by the fact that it is typically desirable to upgrade a computer's processors from time to time. Such upgrades must typically be scheduled during non-peak times in order to minimize the downtime or performance degradation of the networked computer system.

The present invention may address one or more of the problems discussed above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In a multiprocessor computer, it may be desirable to remove or replace one or more of the processors for various reasons. As described herein, the computer may be placed into a sleep mode during processor removal or replacement. Specifically, all processors are placed into a sleep mode. The power to the processor to be removed or replaced is then disconnected, and the user is informed that the processor may be removed or replaced. Once the processor has been replaced, the replacement processor is powered up, and it is configured in the same manner as the processor it replaced. Once configured, the replacement processor is placed into a sleep mode. Then, all processors are awakened, and the computer is returned to normal operation without the need to reboot the computer.

BRIEF DESCRIPTION OF THE DRAWINGS

Various advantages of the invention may become apparent upon reading the following detailed description of specific embodiments and upon reference to the drawings in which.

DETAILED DESCRIPTION OF SPECIFIC EMBODIMENTS

Figure 1:
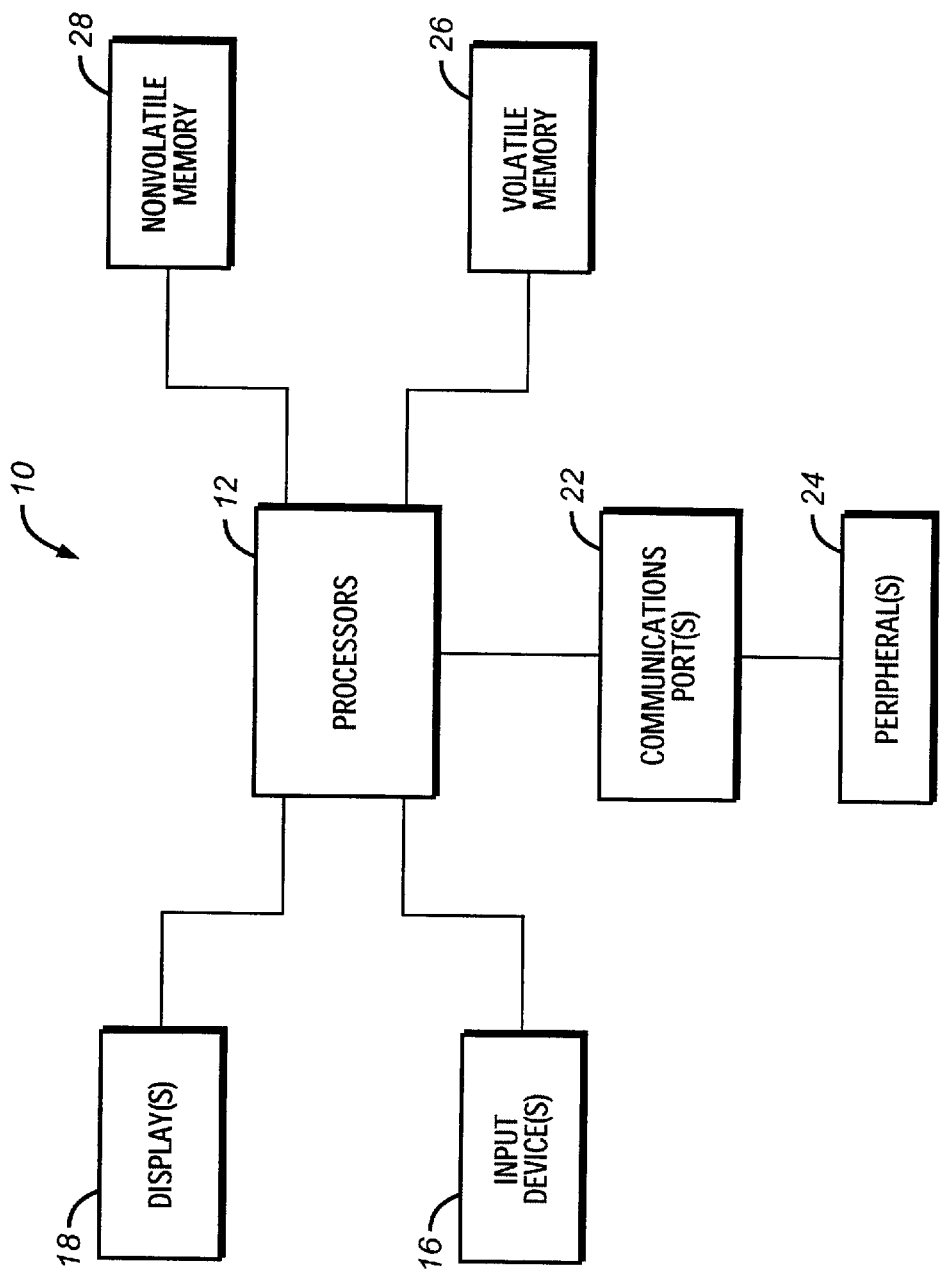
FIG. 1 illustrates a high level block diagram of an exemplary multiprocessor computer system.

Turning now to the drawings, and referring initially to FIG. 1, a block diagram depicting a multiprocessor computer system, generally designated by the reference numeral 10, is illustrated. In this embodiment of the system 10, multiple processors 12, such as microprocessors, control many of the functions of the system 10. In one particular embodiment, the processors 12 may be Pentium II Xeon (Slot 2) processors available from Intel Corporation, for example.

Various other devices may be coupled to the processors 12, depending upon the functions that the system 10 performs. For instance, the system 10 may include various input devices. The input devices may include user interfaces such as a keyboard, a mouse, and/or a voice recognition system, for instance. The system 10 may also include a display 18. The display 18 may include a CRT, a flat panel display, LEDs, a graphical user interface (GUI), and/or an audio system, for instance.

A communications port 22, such as a network interface card for example, may also be coupled to the processors 12. The communications port 22 may be coupled to one or more peripheral devices 24. Such peripheral devices 24 may include a modem, a printer, and/or a scanner, for instance. Of course, the peripheral devices 24 may also include additional computers, as the computer system 10 may act as a server in a computer network that includes multiple computers and other peripheral devices.

Because the processors 12 control the functioning of the system 10 generally under the control of software programming, memory is coupled to the processors 12 to store and to facilitate execution of these programs. For instance, the processor 12 may be coupled to volatile memory 26, which may include dynamic random access memory (DRAM) and/or static random access memory (SRAM). In addition, the processors 12 may be coupled to nonvolatile memory 28, which may include read only memory, a hard drive, and/or flash memory. Typically, the size of the nonvolatile memory 28 is selected to be large enough to store any necessary operating system, certain application programs, and fixed data, while the volatile memory 26 may be quite large so that it may store dynamically loaded applications.

Figure 2:
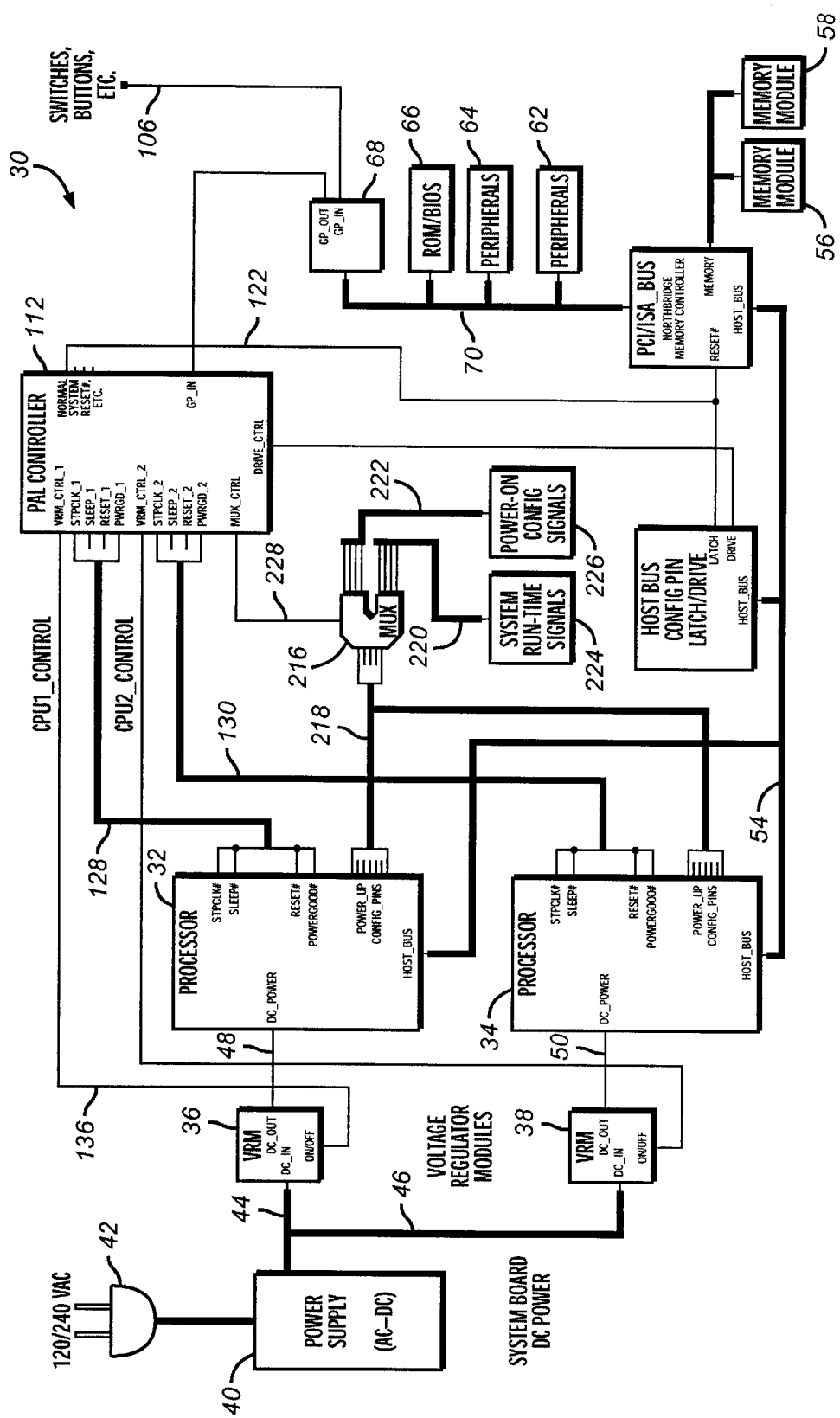
FIG. 2 illustrates a more detailed block diagram of an exemplary multiprocessor computer.

A block diagram of a multiprocessor personal computer, such as one that may be used in the system 10, is illustrated in FIG. 2 and generally designated by the reference numeral 30. In this embodiment, the computer 30 includes two processors, or CPUs, 32 and 34. Each of the processors 32 and 34 is illustrated as being powered by its own dedicated voltage regulator module (VRM) 36 and 38, respectively. A power supply 40, which is typically coupled to an a.c. source via a plug 42, delivers a d.c. supply voltage to each VRM 36 and 38 via a respective line 44 and 46. The VRMs 36 and 38 deliver d.c. power to the respective processors 32 and 34 via the respective lines 48 and 50.

As in a conventional computer, both of the processors 32 and 34 are coupled to a bridge/memory controller 52 via a bus 54. Although a single bus 54 is illustrated, the teachings set forth herein may be applied to a multiple bus design, such as a split bus, as well. The bridge/memory controller 52 communicates with memory modules 56 and 58 via a bus 60. As described with reference to FIG. 1, the memory modules 56 and 58 may include, for instance, volatile memory and/or nonvolatile memory. The bridge/memory controller 52 also communicates with various peripherals 62 and 64, as well as with ROM/BIOS 66 and a GP 68, via a PCI/ISA bus 70.

Unlike conventional computers, the computer 30 advantageously includes a scheme that allows one of the processors 32 or 34 to be removed and/or replaced without shutting down the computer 30. As described below, this scheme places both processors 32 and 34 into a sleep mode before disconnecting power to the processor to be replaced. After the processor has been replaced, the replacement processor is configured properly and put to sleep before both processors are awakened to resume operation without rebooting the computer 30. This scheme is referred to as a "warm swap" because the computer is not rebooted as required in a conventional "cold swap."

Figure 3:
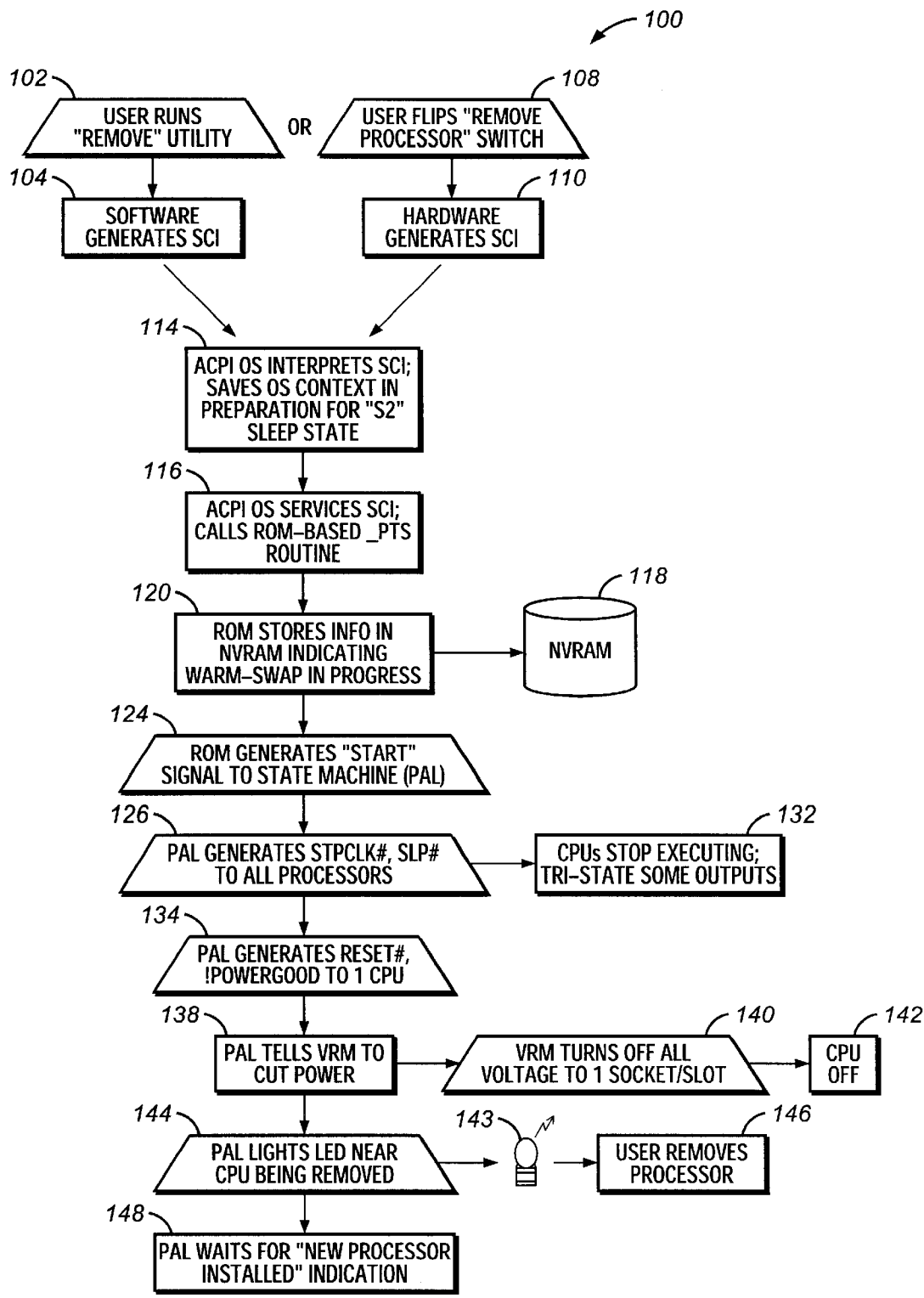
FIG. 3 illustrates a flowchart of an exemplary method for removing a processor in the multiprocessor computer of FIG. 2.

Referring additionally to the flowchart 100 of FIG. 3, if a user wishes to remove and/or replace one of the processors 32 or 34 for an upgrade or routine maintenance, for example, the user may run a utility program (block 102) that allows the user to initiate the removal of a processor. The user will typically provide information regarding the identity or location of the processor to be removed or replaced, such as the CPU type or logical ID. In this case, the software generates an SCI interrupt. (Block 104). However, if the computer 30 does not utilize such a program, the user may flip an appropriate switch 106. (Block 108). In this case, the GP 68 generates an SCI interrupt. (Block 110).

In either case, the SCI interrupt is intended to notify the operating system of the computer 30 that a processor is to be removed and/or replaced. As illustrated in FIG. 2, the SCI interrupt is delivered to a controller 112, which in this example is implemented using a PAL. The operating system is advantageously ACPI-compliant (advanced configuration power interface). As is known, ACPI is a power management scheme primarily used in laptop computers to control power delivery to various circuits. However, as explained below, it has been determined that ACPI, or a similar suitable scheme, may be useful in the multiprocessor computer 30 to facilitate the removal of one or more of the processors while the other processor or processors remain in the computer 30. For the purposes of this example, the processor 32 will be removed and replaced while the processor 34 remains in the computer 30.

The ACPI-compliant operating system interprets the SCI interrupt and prepares to place the identified processor 32 into a sleep mode. (Block 114). Specifically, the processor 32 will be placed into an ACPI "S2" sleep state. To achieve this result, the operating system services the SCI interrupt by calling a __PTS routine stored in the ROM/BIOS 66. (Block 116). This routine stores information in non-volatile RAM (NVRAM 118, such as a hard disk associated with the computer 30. (Block 120).

Once this information has been stored, the routine generates a "start" signal and delivers it to the controller 112 via the bridge/memory controller 52 on line 122. (Block 124). The controller 112 generates a stop clock signal STPCLK# and a sleep signal SLP#. (Block 126). These signals are delivered to each processor 32 and 34 via the respective buses 128 and 130. These signals place the processors 32 and 34 into a low power state so that they stop providing internal clock signals to all units except the bus unit and the APIC unit. The processors 32 and 34 also stop executing commands and tri-state some outputs. (Block 132).

After the processors 32 and 34 have been placed into the sleep state, the controller 112 delivers a reset signal RESET# to the processor 32 being removed, followed by de-assertion of the PWRGOOD signal. (Block 134). Via the line 136, the controller 112 then directs the VRM 36 associated with the processor 32 to stop delivering power to the processor 32. (Block 138). In response to this direction, the VRM 36 turns off all voltages being applied to the processor 32 to turn off the processor 32. (Blocks 140 and 142).

The processor 32 is now ready for removal. To facilitate user identification of the processor to be removed, a respective indicator, such as an LED 143, may be placed near each processor 32 and 34, and the respective indicator may be illuminated to designate the processor or processors to be removed. (Block 144). The utility program may also or alternatively provide a direction to the user that the processor may now be removed, along with an indication of which processor may be removed. The user may then remove the processor 32. (Block 146).

It should be noted that quick switches (not shown) are advantageously used to couple the inputs and outputs of the processors 32 and 34 to other portions of the computer 30. The quick switches isolate the GTL+ bus of the processors from the host bus 54, and also disconnect the ADS#, REQ#, and a small set of control signals. CMOS control signals are also disconnected from the rest of the system, and the bridge/memory controller 52 and any other GTL+ agents that do not have their GTL+ interface tri-stated and disabled, or that do not have electrostatic discharge protection on their GTL+ data and address inputs, are disconnected from that portion of the bus 54 by the quick switches. Thus, once the user removes the processor 32, the quick switches insure that the computer 30 may continue operation without the processor 32.

Figure 4:
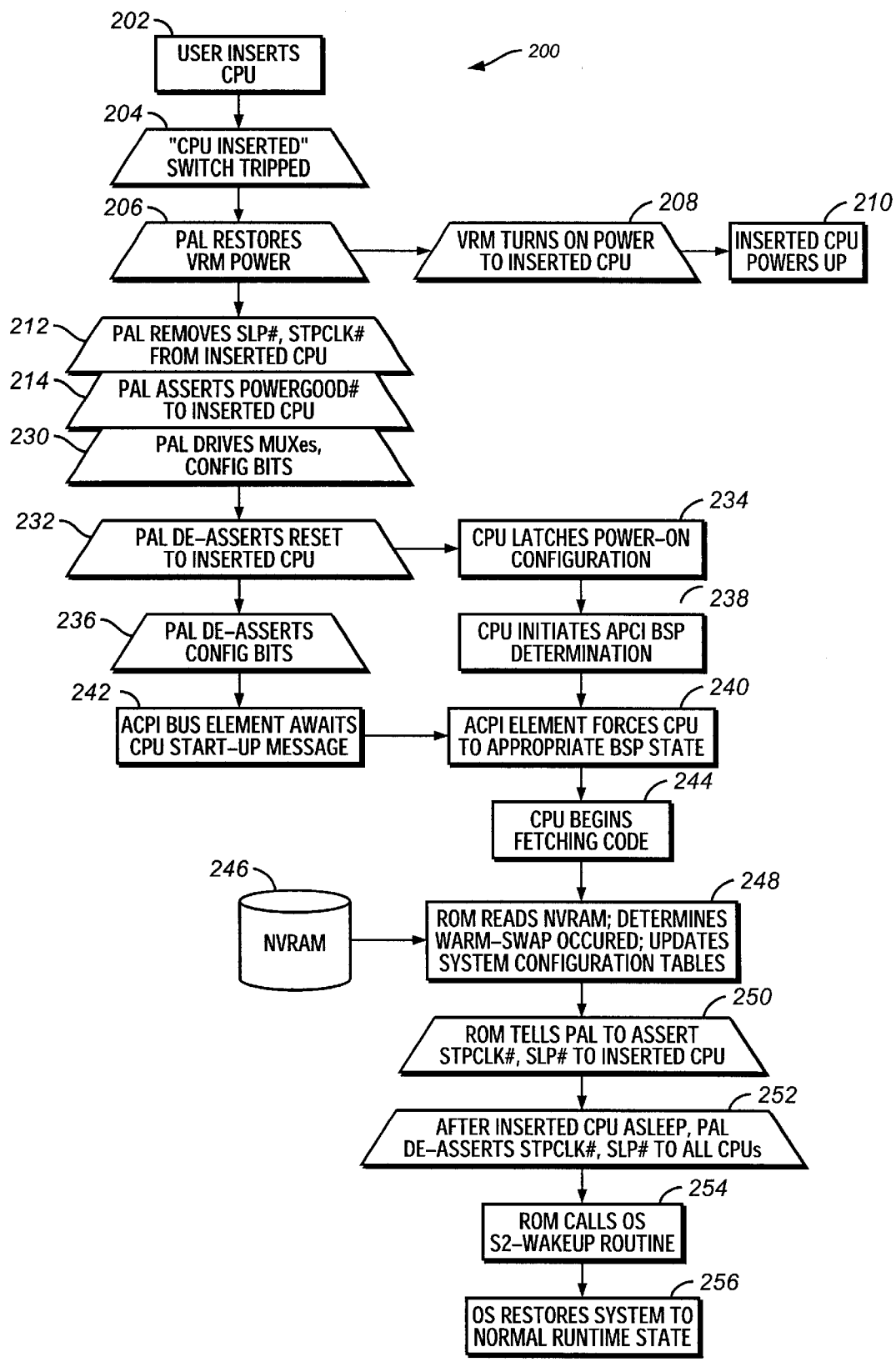
FIG. 4 illustrates a flowchart of an exemplary method for installing a processor in the multiprocessor computer FIG. 2.

After the processor 32 has been removed, the user may replace it with another processor. During this period, the controller 112 waits for an indication that another processor has been installed. (Block 148). Referring now to the flowchart 200 of FIG. 4, once the user inserts another processor, a switch (not illustrated) is tripped to indicate to the controller 112 that the processor has been inserted. (Blocks 202 and 204). The controller 112 then directs the VRM 36 associated with the replacement processor 32 to begin delivering power to the processor 32, and the replacement processor 32 powers up. (Blocks 206,208, and 210). After any electrostatic discharge transients are gone, the quick switches, which disconnected the bridge/memory controller 52 and certain control signals on this processor slot when the processor was removed, are now switched back to their normal closed positions. The controller 112 then de-asserts the stop clock signal STPCLK# and the sleep signal SLP# from the replacement processor 32, and the controller 112 asserts the PWRGOOD# signal to the replacement processor 32. (Blocks 212 and 214).

Figure 5:
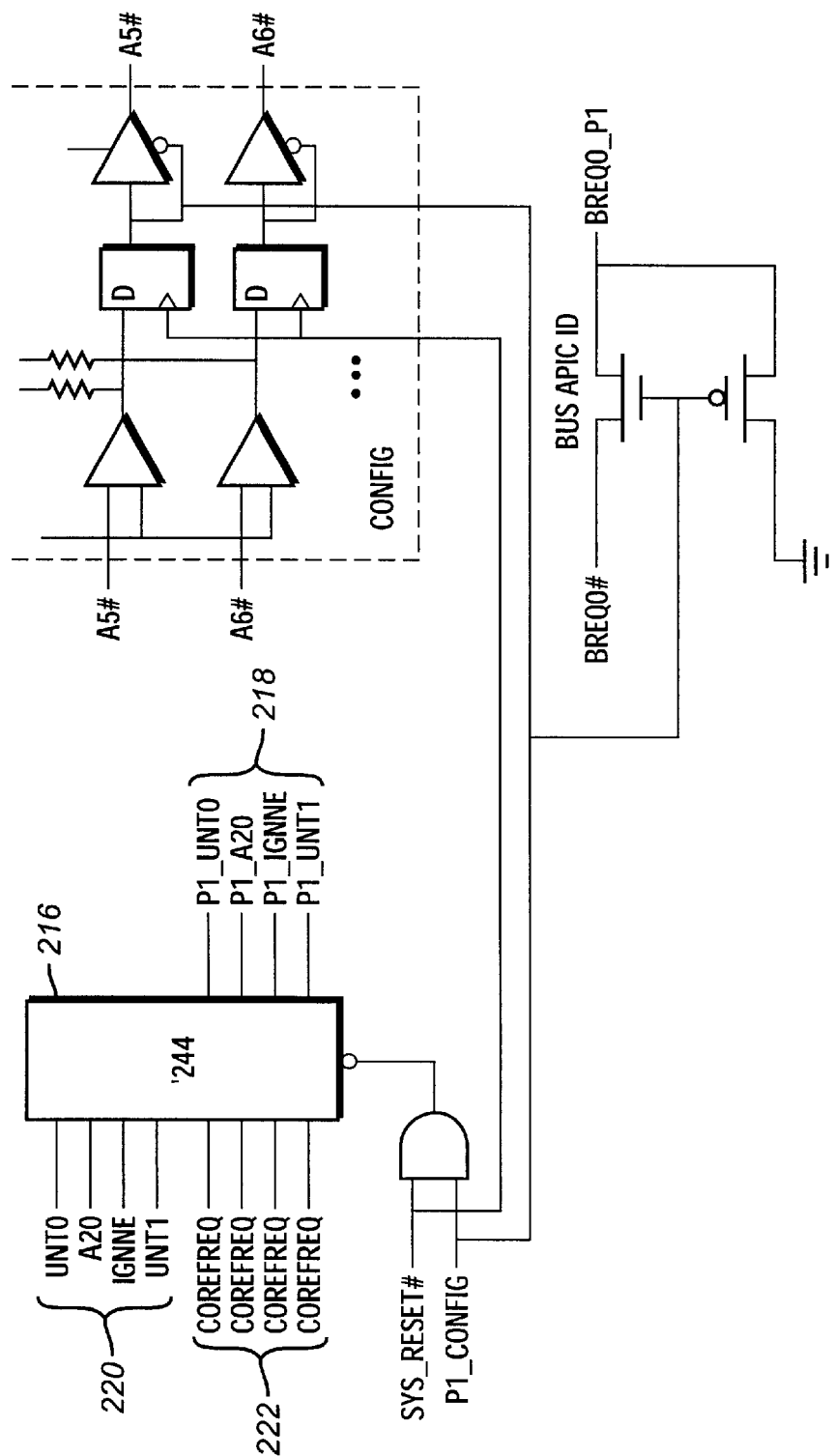
FIG. 5 illustrates a logical block diagram of a portion of the multiprocessor computer of FIG. 2.

Now that the replacement processor 32 has been powered up, it is configured. As illustrated in FIG. 2, a multiplexor 216 is coupled to the POWER_UP and CONFIG_PINS inputs of each processor 32 and 34 by a bus 218. The multiplexor 216 has two sets of inputs 220 and 222. System run-time signals 224 are delivered to the multiplexor on the input 220, and power-on configuration signals 226 are delivered to the multiplexor on the input 222. The controller 112 is coupled to the input select pin of the multiplexor 216 via a line 228. Thus, the controller 112 determines which input signals are delivered by the multiplexor 216 to the processors 32 and 34. During normal operation of the computer 30, the system run-time signals are selected for delivery to the processors 32 and 34. As illustrated in greater detail in FIG. 5, the system run-time signals for a Pentium II Xeon processor are UNT0, A20, IGNNE, and UNT1. However, during the processor replacement operation, the power-on configuration signals are delivered to the processor 32 to reset it to the same state as the original processor 32 at the time it was removed. (Block 230). As illustrated in greater detail in FIG. 5, the power-on configuration signals for a Pentium II Xeon processor include various core frequency signals CORE FREQ, where the system component that drives the core frequency ratio to the swapped processor slot drives the core frequency ratio appropriate for the replacement processor 32.

The controller 112 also de-asserts the reset signal RESET# to the replacement processor 32. (Block 232). The replacement processor 32 latches the power-on configuration signals, and, after an appropriate delay following the reset signal RESET#, the controller 112 ceases delivery of the power-on configuration signals. (Blocks 234 and 236). An external APIC agent, generates a FIPI (Finish Interprocessor Interrupt) to prevent the replacement processor 32 from becoming a BSP (Boot Strap Processor). The FIPI is followed by a SIPI (Startup Interprocessor Interrupt) which will cause the replacement processor 32 to start executing in ROM/DIOS 66 at the reset vector. (Blocks 238, 240, and 242).

The replacement processor 32 then starts fetching code, and the ROM/BIOS 66 will read the information stored in the NVRAM and determine that a warm swap has occurred. (Blocks 244, 246, and 248). Thus, the processor 32 may update the system configuration tables with the core frequency information if appropriate. The ROM/BIOS 66 then directs the controller 112 to assert the stop clock signal STPCLK# and the sleep signal SLP# to the replacement processor 32 to place the replacement processor 32 into a sleep state. (Block 250). After the replacement processor 32 is asleep, the ROM/BIOS 66 will then begin its normal method for handling a wake-up event from the S2 sleep state. Thus, the ROM/BIOS 66 deasserts the stop clock signals STPCLK# and the sleep signals SLP# from both processors 32 and 34. (Block 252). The ROM/BIOS 66 calls the S2 wake-up routine in the operating system, and the operating system restores the computer 30 to its normal run-time state. (Blocks 254 and 256).

Using the method described above, it should be noted that the processor 34 is effectively removed from operation in the computer 30 while the processor 32 is being removed or replaced. However, the processor 34 is merely put to sleep—it is not shut off. Thus, this method does not cause the loss of data, and it does not require the computer 30 to be rebooted after the processor 32 has been replaced. Therefore, although the replacement of a processor may cause the computer 30 to be temporarily removed from the system 10, the downtime of the computer 30 is minimized.

Although the embodiment described above dealt with the removal or replacement of a single processor, multiple processors may be removed or replaced using substantially the same technique. If multiple processors are to be removed or replaced, these processors may be identified by a failure detection system or by the user via a software or hardware interface. When all removals or replacements have been made, the controller 112 will begin the reinitialization sequence to return the computer to normal operation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of replacing a processor in a multiprocessor computer having a plurality of processors, the method comprising the acts of:
   (a) determining that one of the plurality of processors is to be replaced;
   (b) placing all of the plurality of processors into a sleep mode;
   (c) disconnecting power to the one of the plurality of processors;
   (d) informing a user to replace the one of the plurality of processors with a replacement processor;
   (e) configuring the replacement processor while the remaining plurality of processors remain in the sleep mode;
   (f) placing the replacement processor into a sleep mode; and
   (g) awakening all of the processors from the sleep mode and returning all processors to normal operation without rebooting the computer.

2. The method, as set forth in claim 1, wherein act (a) comprises the act of:
   identifying which processor is to be replaced.

3. The method, as set forth in claim 1, wherein act (a) comprises the act of:
   generating an SCI interrupt and delivering the SCI interrupt to an operating system of the computer.

4. The method, as set forth in claim 3, wherein the act of generating is performed using software.

5. The method, as set forth in claim 3, wherein the act of generating is performed using hardware.

6. The method, as set forth in claim 1, wherein act (b) comprises the act of:
   delivering a respective stop clock signal to each processor.

7. The method, as set forth in claim 1, wherein act (b) comprises the act of:
   delivering a respective sleep signal to each processor.

8. The method, as set forth in claim 1, wherein act (b) comprises the act of:
   storing configuration information of the one of the plurality of processors.

9. The method, as set forth in claim 1, wherein act (c) comprises the act of:
   shutting off a voltage regulator module associated with the processor.

10. The method, as set forth in claim 1, wherein act (d) comprises the act of:
    illuminating an LED located near the one of the plurality of processors to be replaced.

11. The method, as set forth in claim 1, wherein act (d) comprises the act of:
    displaying a message onto a display associated with the computer to inform the user to replace the one of the plurality of processors.

12. The method, as set forth in claim 1, wherein act (e) comprises the act of:
    configuring the replacement processor in a manner identical to the one of the plurality of processors replaced by the replacement processor.

13. The method, as set forth in claim 1, wherein act (e) comprises the act of:
    turning on the voltage regulator module associated with the replacement processor.

14. The method, as set forth in claim 8, wherein act (e) comprises the act of:
    reading the configuration information of the one of the plurality of processors to configure the replacement processor.

15. The method, as set forth in claim 1, wherein act (f) comprises the act of:
    delivering a stop clock signal to the replacement processor.

16. The method, as set forth in claim 1, wherein act (f) comprises the act of:
    delivering a sleep signal to the replacement processor.

17. The method, as set forth in claim 1, wherein act (g) comprises the act of:
    calling an operating system of the computer to awaken the processors.

18. The method, as set forth in claim 1, wherein acts (a) through (g) are performed in order.

19. A method of replacing a processor in a multiprocessor computer having a plurality of processors, a like plurality of voltage regulator modules powering each respective processor, and a controller coupled to each processor and voltage regulator module, the method comprising the acts of:
    (a) determining that one of the plurality of processors is to be replaced;
    (b) placing all of the plurality of processors into a sleep mode;
    (c) shutting off the voltage regulator module associated with the one of the plurality of processors;
    (d) informing a user to replace the one of the plurality of processors with a replacement processor;
    (e) turning on the voltage regulator module associated with the replacement processor;
    (f) configuring the replacement processor while the remaining plurality of processors remain in the sleep mode;
    (g) placing the replacement processor into a sleep mode; and
    (h) awakening all of the processors from the sleep mode and returning all processors to normal operation without rebooting the computer.

20. The method, as set forth in claim 19, wherein act (a) comprises the act of:
    identifying which processor is to be replaced.

21. The method, as set forth in claim 19, wherein act (a) comprises the act of:
    generating an SCI interrupt and delivering the SCI interrupt to an operating system of the computer.

22. The method, as set forth in claim 21, wherein the act of generating is performed using software.

23. The method, as set forth in claim 21, wherein the act of generating is performed using hardware.

24. The method, as set forth in claim 19, wherein act (b) comprises the act of:

the controller delivering a respective stop clock signal to each processor.

25. The method, as set forth in claim 19, wherein act (b) comprises the act of:

the controller delivering a respective sleep signal to each processor.

26. The method, as set forth in claim 19, wherein act (b) comprises the act of:

storing configuration information of the one of the plurality of processors.

27. The method, as set forth in claim 19, wherein act (c) comprises the act of:

the controller shutting off the voltage regulator module associated with the processor.

28. The method, as set forth in claim 19, wherein act (d) comprises the act of:

the controller illuminating an LED located near the one of the plurality of processors to be replaced.

29. The method, as set forth in claim 19, wherein act (d) comprises the act of:

displaying a message onto a display associated with the computer to inform the user to replace the one of the plurality of processors.

30. The method, as set forth in claim 19, wherein act (e) comprises the act of:

the controller turning on the voltage regulator module associated with the replacement processor.

31. The method, as set forth in claim 19, wherein act (f) comprises the act of:

configuring the replacement processor in a manner identical to the one of the plurality of processors replaced by the replacement processor.

32. The method, as set forth in claim 31, wherein act (f) comprises the act of:

reading the configuration information of the one of the plurality of processors to configure the replacement processor.

33. The method, as set forth in claim 19, wherein act (g) comprises the act of:

the controller delivering a stop clock signal to the replacement processor.

34. The method, as set forth in claim 19, wherein act (g) comprises the act of:

the controller delivering a sleep signal to the replacement processor.

35. The method, as set forth in claim 19, wherein act (h) comprises the act of:

calling an operating system of the computer to awaken the processors.

36. The method, as set forth in claim 19, wherein acts (a) through (h) are performed in order.

37. A multiprocessor computer comprising:

means for determining that one of the plurality of processors is to be replaced;

means for placing all of the plurality of processors into a sleep mode;

means for disconnecting power to the one of the plurality of processors;

means for informing a user to replace the one of the plurality of processors with a replacement processor;

means for configuring the replacement processor while the remaining plurality of processors remain in the sleep mode;

means for placing the replacement processor into a sleep mode; and means for awakening all of the processors from the sleep mode and returning all processors to normal operation without rebooting the computer.

38. The computer, as set forth in claim 37, wherein the determining means comprises:

means for identifying which processor is to be replaced.

39. The computer, as set forth in claim 37, wherein the determining means comprises:

means for generating an SCI interrupt and for delivering the SCI interrupt to an operating system of the computer.

40. The computer, as set forth in claim 37, wherein the means for placing all of the plurality of processors into a sleep mode comprises:

means for delivering a respective stop clock signal to each processor.

41. The computer, as set forth in claim 37, wherein the means for placing all of the plurality of processors into a sleep mode comprises:

means for delivering a respective sleep signal to each processor.

42. The computer, as set forth in claim 37, wherein the means for placing all of the plurality of processors into a sleep mode comprises:

means of storing configuration information of the one of the plurality of processors.

43. The computer, as set forth in claim 37, wherein the disconnecting means comprises:

a voltage regulator module associated with the processor.

44. The computer, as set forth in claim 37, wherein the informing means comprises:

an LED located near the one of the plurality of processors to be replaced.

45. The computer, as set forth in claim 37, the informing means comprises:

a display associated with the computer adapted to display a message to inform the user to replace the one of the plurality of processors.

46. The computer, as set forth in claim 37, wherein the configuring means comprises:

means for configuring the replacement processor in a manner identical to the one of the plurality of processors replaced by the replacement processor.

47. The computer, as set forth in claim 42, wherein the configuring means comprises:

means for reading the configuration information of the one of the plurality of processors to configure the replacement processor.

48. A computer comprising:

a plurality of microprocessors operatively coupled to a bus;

a plurality of voltage regulator modules, each voltage regulator module being operatively coupled to a respective one of the plurality of microprocessors; and a controller operatively coupled to each of the plurality of microprocessors and to each of the plurality of voltage regulator modules, the controller placing all of the plurality of microprocessors coupled to the bus into a sleep state in response to receiving a signal indicating that one of the plurality of microprocessors is to be replaced, and the controller turning off the respective one of the plurality of voltage regulator modules coupled to the one of the plurality of microprocessors after the controller has placed the plurality of microprocessors into the sleep state, and, after the one of the plurality of microprocessors has been replaced with a replacement microprocessor, the controller turning on the respective one of the plurality of voltage regulator modules coupled to the replacement microprocessor and resetting the replacement microprocessor for configuration, the controller placing the replacement microprocessor into the sleep state after configuration.

* * * * *